(12) United States Patent
Kuros et al.

(10) Patent No.: US 9,618,064 B2
(45) Date of Patent: Apr. 11, 2017

(54) SYSTEM AND METHOD FOR PREVENTING CENTRIFUGAL CLUTCH LOCK-UPS WITHIN A TRANSMISSION OF A WORK VEHICLE

(71) Applicant: CNH Industrial America, LLC, New Holland, PA (US)

(72) Inventors: Pawel Kuros, Wood Dale, IL (US); Peter J. Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/565,912

(22) Filed: Dec. 10, 2014

(65) Prior Publication Data

US 2016/0169304 A1   Jun. 16, 2016

(51) Int. Cl.
*F16D 48/10* (2006.01)
*F16D 48/06* (2006.01)
*F16D 43/284* (2006.01)

(52) U.S. Cl.
CPC ......... *F16D 48/066* (2013.01); *F16D 43/284* (2013.01); *F16D 48/10* (2013.01); *F16D 2500/1027* (2013.01); *F16D 2500/304* (2013.01); *F16D 2500/3024* (2013.01); *F16D 2500/3067* (2013.01);
(Continued)

(58) Field of Classification Search
None
See application file for complete search history.

(56) References Cited

U.S. PATENT DOCUMENTS 3,339,672 A    9/1967  Crandall
3,712,437 A *  1/1973  Snyder .................. F16D 43/284
                                                137/57
(Continued)

FOREIGN PATENT DOCUMENTS

DE    102004054909    7/2005
WO    2014/140041     9/2014

OTHER PUBLICATIONS

Boston Gear—Centric Products (100 pages) Copyright Date 2006 http://www.gmbassociates.co.uk/downloads/Centric%20Clutch%20Products%20Catalogue.pdf.
(Continued)

*Primary Examiner* — Justin Holmes
(74) *Attorney, Agent, or Firm* — Rickard K. DeMille; Rebecca L. Henkel (57) ABSTRACT

In one aspect, a computer-implemented method for preventing centrifugal clutch lock-ups within a work vehicle transmission may generally include transmitting a signal associated with disengaging a clutch of the transmission, wherein the clutch includes a hydraulic actuator having a pressure relief valve. The method may also include monitoring a pressure of the hydraulic fluid supplied to the actuator relative to a predetermined pressure threshold and monitoring a rotational speed of a clutch can associated with the clutch relative to a predetermined speed threshold, wherein the speed threshold is defined relative to a lock-up speed associated with the clutch can. In addition, the method may include transmitting a lock-up signal associated with limiting the rotational speed of the clutch can and/or providing an indication that a clutch lock-up is likely to occur when the pressure exceeds the pressure threshold and the rotational speed exceeds the speed threshold.

20 Claims, 5 Drawing Sheets

(52) U.S. Cl.
CPC .............. *F16D 2500/30415* (2013.01); *F16D 2500/30825* (2013.01); *F16D 2500/70454* (2013.01); *F16D 2500/70605* (2013.01); *F16D 2500/7101* (2013.01)

(56) References Cited

U.S. PATENT DOCUMENTS

| | | | | |
|---|---|---|---|---|
| 3,913,715 | A | * | 10/1975 | Groves ................. F16D 43/284 137/48 |
| 4,006,808 | A | * | 2/1977 | Starling ................ F16D 43/284 137/49 |
| 4,081,065 | A | | 3/1978 | Smyth et al. |
| 4,249,647 | A | * | 2/1981 | Snoy ........................ F16D 25/14 192/103 FA |
| 4,485,903 | A | | 12/1984 | Koivunen |
| 4,766,988 | A | * | 8/1988 | Seibert .............. B60W 30/1819 180/197 |
| 4,875,391 | A | | 10/1989 | Leising et al. |
| 4,942,787 | A | | 7/1990 | Aoki et al. |
| 5,035,312 | A | | 7/1991 | Asayama et al. |
| 5,259,489 | A | | 11/1993 | Kimura et al. |
| 5,361,882 | A | | 11/1994 | Tipton |
| 5,551,548 | A | | 9/1996 | Shubinsky |
| 5,685,803 | A | | 11/1997 | Furukawa et al. |
| 6,561,948 | B2 | | 5/2003 | Markyvech et al. |
| 7,171,942 | B2 | | 2/2007 | Nickel |
| 7,338,409 | B2 | | 3/2008 | Ronge et al. |
| 7,480,555 | B2 | | 1/2009 | Jacobs |
| 7,591,358 | B2 | | 9/2009 | Pick |
| 8,021,257 | B2 | | 9/2011 | Foster et al. |
| 8,113,988 | B2 | | 2/2012 | Foster |
| 8,172,059 | B2 | | 5/2012 | Reuschel et al. |
| 8,291,770 | B2 | | 10/2012 | Nakatsuka et al. |
| 2004/0045784 | A1 | | 3/2004 | Ebert et al. |
| 2009/0105916 | A1 | | 4/2009 | Gooden et al. |
| 2012/0000740 | A1 | | 1/2012 | Shimizu et al. |
| 2013/0032444 | A1 | | 2/2013 | Baehr et al. |

OTHER PUBLICATIONS

European Search Report for European Application No. 15198276.6 dated Mar. 1, 2016 (7 pages).

* cited by examiner

SYSTEM AND METHOD FOR PREVENTING CENTRIFUGAL CLUTCH LOCK-UPS WITHIN A TRANSMISSION OF A WORK VEHICLE

FIELD OF THE INVENTION

The present subject matter relates generally to work vehicles and, more particularly, to a system and method for preventing the occurrence of centrifugal clutch lock-ups within a work vehicle transmission.

BACKGROUND OF THE INVENTION

Transmissions with hydraulically actuated clutches (e.g., continuously variable transmissions (CVTs) and power shift transmissions (PSTs)) are well known in the art. Typically, a hydraulically actuated clutch includes a cylindrical enclosure or can containing clutch plates configured to be engaged/disengaged with one another so as to engage/disengage the clutch. Engagement of the clutch plates is achieved by actuating a hydraulic piston relative to one or more of the plates. Specifically, pressurized hydraulic fluid is supplied to a chamber associated with the piston such that the pressurized fluid actuates the piston in a manner that engages the clutch plates. When the pressurized fluid is no longer being supplied to the chamber, a clutch or return spring may be configured to apply a biasing force that pulls the clutch plates apart and returns the piston to its unactuated position, thereby disengaging the clutch.

For many hydraulically actuated clutches (e.g., large wet clutches), it is often difficult to prevent self-energizing of the clutch when it is spinning at a relatively high speed. Specifically, if there is fluid behind the piston and the clutch can is spinning, the fluid exerts a pressure on the piston due to the centrifugal effect. In certain instances, the force applied by the fluid may be sufficient to overcome the biasing force applied by the return spring, thereby forcing the clutch into engagement and resulting in a centrifugal clutch lock-up. Such a lock-up can result in the clutch being significantly damaged or even destroyed.

To prevent centrifugal clutch lock-ups from occurring, clutches are often provided with a pressure relief valve that is configured to allow fluid to escape from the piston chamber, thereby reducing the fluid pressure within the chamber. Unfortunately, instances occur when the valve does not properly open after a clutch has been turned off. In such instances, a centrifugal clutch lock-up may still occur if the speed of the associated clutch can reaches a given lock-up speed.

Accordingly, an improved system and method for preventing centrifugal clutch lock-ups, particularly when an associated pressure relief valve does not open when a clutch is commanded to be disengaged, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computer-implemented method for preventing centrifugal clutch lock-ups within a transmission of a work vehicle. The method may generally include transmitting a signal associated with disengaging a clutch of the transmission, wherein the clutch includes a hydraulic actuator having a pressure relief valve configured to allow hydraulic fluid to be evacuated from a piston chamber of the actuator when the pressure relief valve is in an opened state. The method may also include monitoring a pressure of the hydraulic fluid supplied to the hydraulic actuator relative to a predetermined pressure threshold and monitoring a rotational speed of a clutch can associated with the clutch relative to a predetermined speed threshold, wherein the predetermined speed threshold is defined relative to a lock-up speed associated with the clutch can. In addition, the method may include transmitting a lock-up signal associated with at least one of limiting the rotational speed of the clutch can or providing an indication that a clutch lock-up is likely to occur when the pressure exceeds the predetermined pressure threshold and the rotational speed exceeds the predetermined speed threshold.

In another aspect, the present subject matter is directed to a system for preventing centrifugal clutch lock-ups within a transmission of a work vehicle. The system may generally comprise a clutch include a clutch can and a hydraulic actuator. The hydraulic actuator may include a piston and may also define a piston chamber. The hydraulic actuator may further include a pressure relief valve configured to allow hydraulic fluid to be evacuated from the piston chamber when the pressure relief valve is in an opened state. The system may also include a clutch control valve configured to control the supply of hydraulic fluid to the hydraulic actuator, a pressure sensor configured to provide pressure measurements associated with a fluid pressure of the hydraulic fluid supplied to the hydraulic actuator and a controller communicatively coupled to the clutch control valve and the pressure sensor. The controller may generally being configured to transmit a signal associated with disengaging the clutch, monitor the fluid pressure of the hydraulic fluid supplied to the hydraulic actuator relative to a predetermined pressure threshold and monitor a rotational speed of the clutch can relative to a predetermined speed threshold, wherein the predetermined speed threshold is defined relative to a lock-up speed associated with the clutch can. In addition, when the pressure exceeds the predetermined pressure threshold and the rotational speed exceeds the predetermined speed threshold, the controller may be configured to transmit a lock-up signal associated with at least one of limiting the rotational speed of the clutch can or providing an indication that a clutch lock-up is likely to occur.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for preventing centrifugal clutch lock-ups within a transmission of a work vehicle. Specifically, in several embodiments, the disclosed system and method may be advantageously utilized with hydraulically actuated clutches (i.e., clutches that are engaged/disengaged using a hydraulic actuator). As indicated above, such clutches often include an internal pressure relief valve that is configured to be opened to allow hydraulic fluid to escape from the piston chamber of the associated hydraulic actuator, thereby reducing the fluid pressure within the chamber and preventing a clutch lock-up. However, in certain instances (e.g., when the clutch control valve sticks or otherwise malfunctions), the pressure relief valve may not be properly opened. In such instances, if the pressure within the chamber is not sufficiently reduced prior to the clutch can reaching its lock-up speed, the clutch will lock-up, thereby resulting in substantial damage to and/or destruction of the clutch.

To prevent such centrifugal lock-ups, the present subject matter discloses a computer-implemented method and related system in which the pressure of the hydraulic fluid supplied to the hydraulic actuator of a given clutch is continuously monitored. For example, a controller of the work vehicle may be communicatively coupled to a pressure sensor configured to sense the pressure of the fluid supplied to the hydraulic actuator. In addition, the controller may also be configured to monitor the rotational speed of the clutch can associated with the clutch being analyzed. By monitoring such parameters, the controller may be configured to determine when the clutch is about to experience a centrifugal lock-up. Specifically, if the fluid pressure supplied to the clutch exceeds a pressure that would otherwise prevent the pressure relief valve from opening (e.g., by preventing the retraction of the piston) and the clutch can is rotating at a speed close to its lock-up speed, the controller may determine that a clutch lock-up will imminently occur if the speed of the clutch can continues to increase. In such instance, the controller may be configured to automatically implement a corrective action in order to limit or reduce the rotational speed of the clutch can (e.g., by limiting or reducing the output speed of the engine or transmission). In addition to such corrective action, or as an alternative thereto, the controller may be configured to provide a warning to the operator (e.g., an audible or visual warning) that a clutch lock-up is likely to occur. In response to the warning, the operator may reduce the speed of the vehicle or execute any other suitable corrective action in order to prevent the clutch lock-up from occurring.

Figure 1:
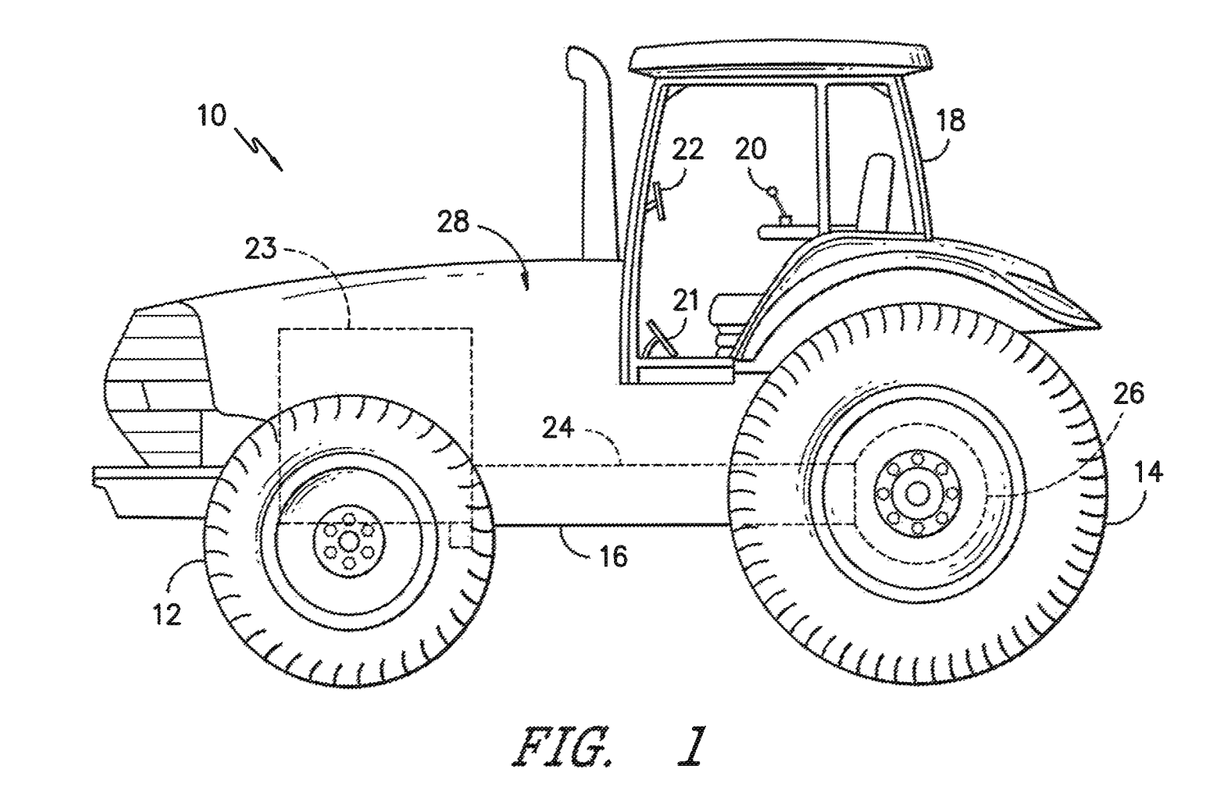
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road. vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via an axle/differential 26. The engine 23, transmission 24, and axle/differential 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
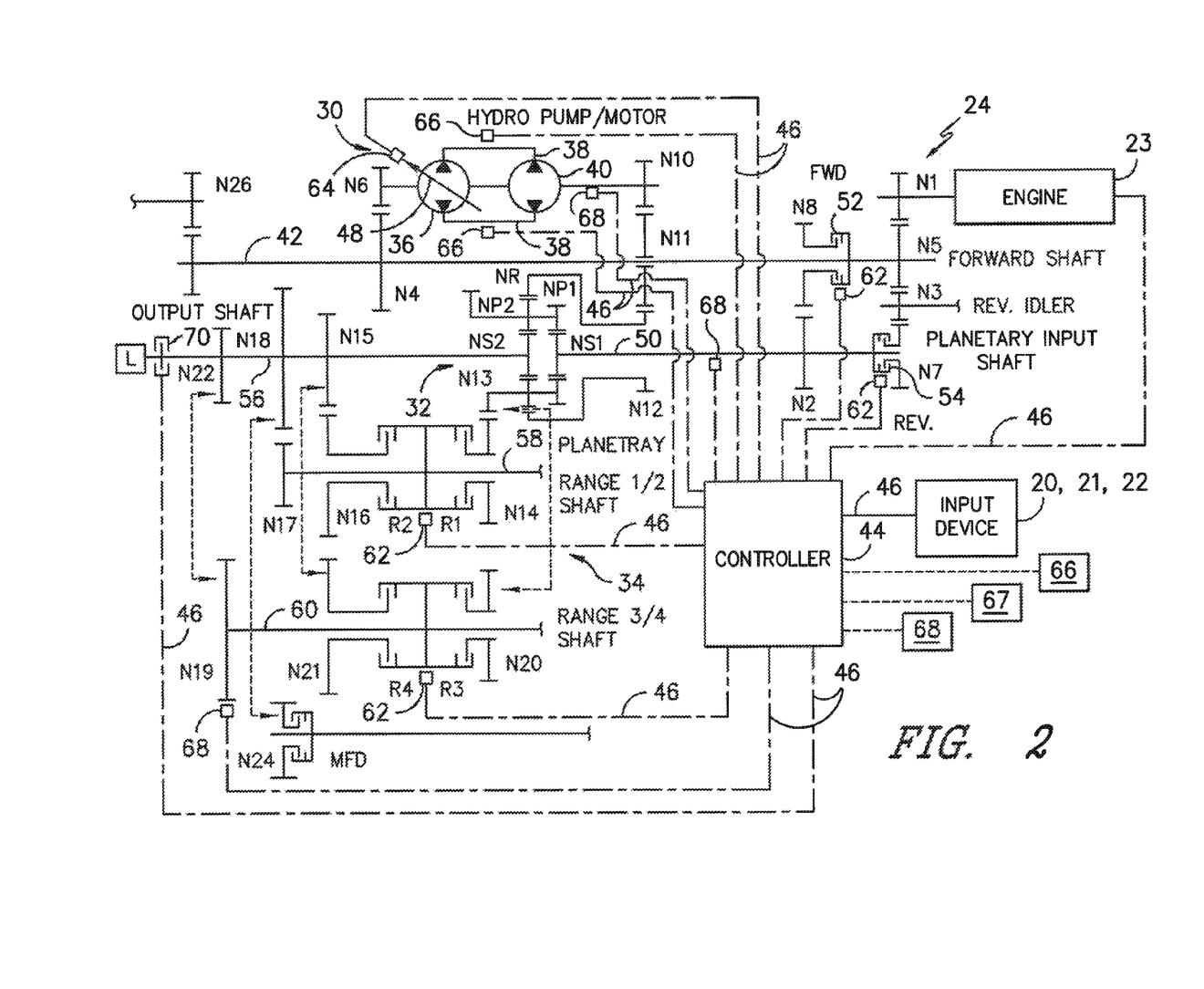
FIG. 2 illustrates a schematic view of one embodiment of a continuously variable transmission suitable for use within the work vehicle shown in FIG. 1.

Referring now to FIG. 2, a schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10.

The hydrostatic power unit 30 of the transmission 10 may generally include a fluid pump 36 coupled by fluid conduits 38 in a closed loop to a fluid motor 40. The motor 40 may be coupled to the engine 23 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to the engine 23 via gears N5 and N1.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 44 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 44 to perform various computer-implemented functions, such as the method 200 described below with reference to FIG. 6. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary power unit 32 may be configured to be selectively coupled to the load L, coupled to the hydrostatic power unit 30 and selectively coupled to the engine 23, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable hydraulic actuators 62 (e.g., hydraulic pistons). Specifically, as will be described below, the controller 44 may be communicatively coupled to corresponding clutch control valves configured to control the supply of hydraulic fluid to each hydraulic actuator 62.

The controller 44 may also be communicatively coupled to a swash plate actuator 64 for automatically controlling the position or angle of the swash plate 48 of the pump 36. For example, the actuator 64 may be configured to move the swash plate 48 across a range of angles in response to control signals (e.g., current commands) received from the controller 44. In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid supplied to each clutch of the transmission 24 (e.g., as will be described below with reference to FIG. 3), speed sensors 67 for sensing the output speed of the transmission 24, the speed(s) of the various clutches (and/or clutch cans) of the transmission 24 and/or the motor speed of the fluid motor 40, swashplate sensors 68 for monitoring the angle of the swashplate 48 and/or any other suitable sensors. Similarly, the controller 44 may also be connected to the engine 23 (e.g., a speed governor of the engine 23) for receiving engine speed data and other information therefrom.

Additionally, as shown in FIG. 2, the controller 44 may also be communicatively coupled to the operator-controlled input device(s) 20, 21, 22 positioned within the cab 18 via a suitable communicative link 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10).

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 44 may be operated to have a pure hydrostatic power flow by disengaging both of the directional clutches 52, 54 and engaging a proper range clutch. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, in several embodiments, the swash plate 48 may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

In addition, for operation when the controller 44 is not powered or is not properly functioning, the parking brake 70 may also be configured to be engaged using a separate means. For instance, the parking brake 70 may be spring applied or may include any other suitable biasing means configured to bias the parking brake 70 into engagement. Alternatively, the parking brake 70 may include a suitable mechanical means for engaging the brake 70 when the controller 44 is not powered or is not properly functioning. Moreover, a means may be provided to store pressurized hydraulic fluid in the event the engine 23 stalls so that the parking brake 70 may remain released and/or may be applied and released several times if needed to control the vehicle 10 until the engine 23 can be restarted. Additionally, other means (e.g., a hand pump) may be provided to disengage the parking brake 70 if there is a fault and no stored pressurized hydraulic fluid is left within the system.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular CVT configuration shown in FIG. 2, but, rather, the present subject matter may be advantageously used with various different CVT configurations. Similarly, it should be appreciated that the present subject matter need not be limited to applications within CVTs. For example, the disclosed system and method may also be advantageously utilized to prevent centrifugal clutch lock-ups within a power shift transmission (PST) or in any other suitable transmission having one or more hydraulically actuated clutches.

Figure 3:
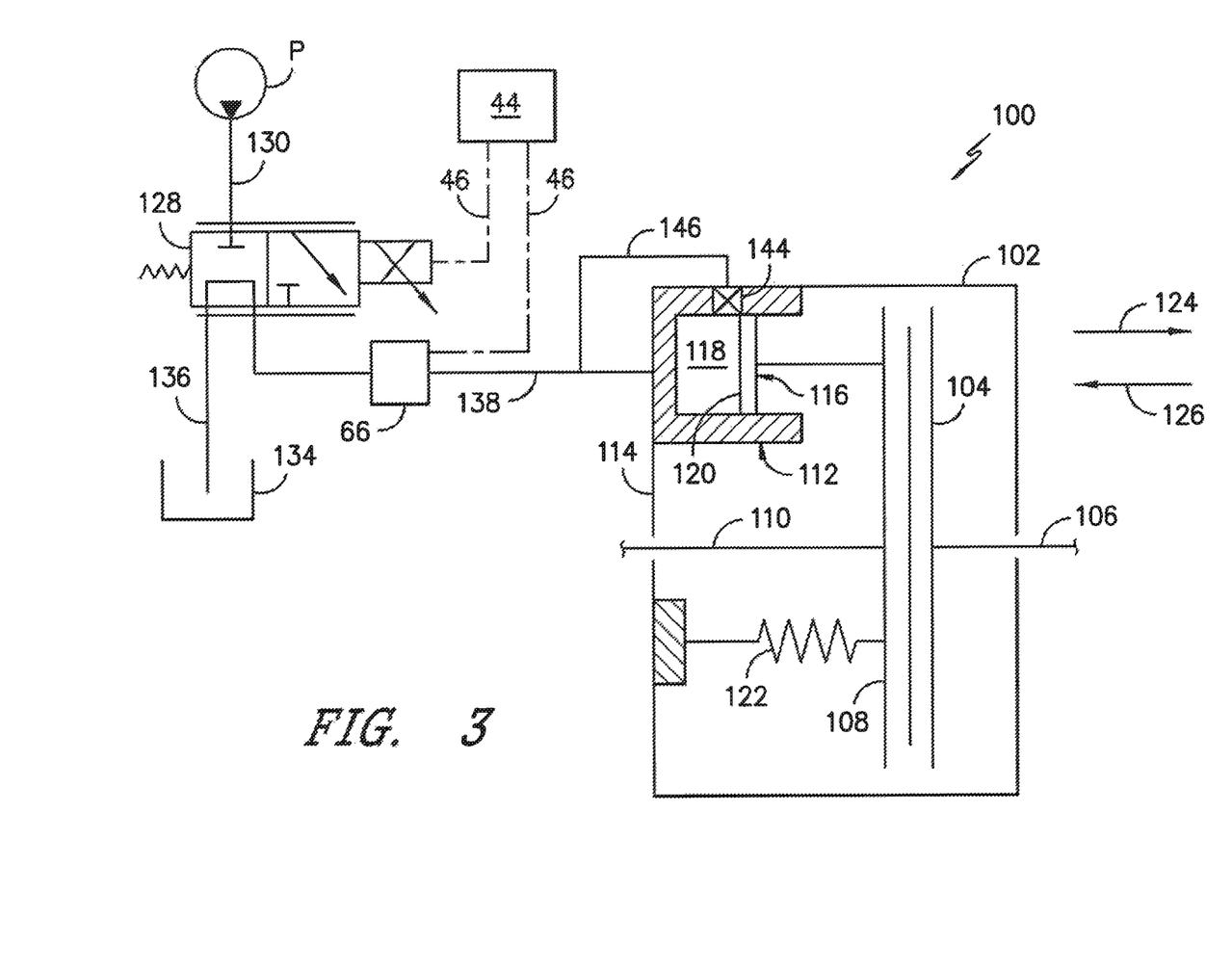
FIG. 3 illustrates a schematic view of one embodiment of a suitable configuration for a hydraulically actuated clutch that may be used as one or more of the clutches of the transmission shown in FIG. 2.

Referring now to FIG. 3, a schematic diagram of one embodiment of a hydraulically actuated clutch 100 is illustrated in accordance with aspects of the present subject matter. The clutch 100 is generally representative of a suitable configuration for the directional clutches 52 and 54, and the range clutches R1-R4 of the transmission 24 described above with reference to FIG. 2. However, as indicated above, application of the present subject matter need not be limited to any particular transmission configuration. Thus, it should be appreciated that the clutch 100 shown in FIG. 3 may also be generally representative of any other suitable hydraulically actuated clutch included within a transmission.

As shown, the clutch 100 may include a cylindrical enclosure or can 102 that contains one or more clutch plates 104 coupled to an output shaft 106 and one or more clutch plates 108 coupled to an input shaft 110. In addition, the clutch 100 may include a hydraulic actuator 112 configured to move or press the clutch plates 104, 108 together so as to move the clutch 100 into an engaged state. As shown, the actuator 112 may include a piston housing 114 formed at least partially by the clutch can 102, a piston 116 housed within the piston housing 114 and a piston chamber 118 defined within the actuator 112 at a head end 120 of the piston 116. Moreover, the clutch may also include a clutch spring(s) 122 configured to provide a biasing force that serves to bias the plates 104, 108 apart so as to move the clutch 100 into a disengaged state. As shown in FIG. 3, the clutch spring(s) 122 is illustrated schematically as being coupled to the clutch plate(s) 108. However, one of ordinary skill in the art should be appreciate that the clutch spring(s) 122 may be configured to directly or indirectly act on the piston 116.

As is generally understood, the biasing force provided by the clutch spring(s) 122 may be configured to maintain the clutch 100 normally in a disengaged state. However, when pressurized hydraulic fluid is supplied to the piston chamber 118 at a sufficient pressure so as to overcome the biasing force applied by the clutch spring(s) 122, the piston 116 may be actuated (e.g., in the direction of the arrow 124) in a manner that pushes the plates 104, 108 together and subsequently engages the clutch 100. Thereafter, under normal operating conditions, when the supply of hydraulic pressure to the actuator 112 is cut-off, the biasing force provided by the clutch spring(s) 122 may cause the piston 116 to retract (e.g., in the direction of arrow 126) and the clutch plate(s) 104, 108 to separate from one another, thereby disengaging the clutch 100.

It should be appreciated that the supply of pressurized hydraulic fluid to the actuator 112 may be controlled by a clutch control valve 128 (e.g., a proportional solenoid pressure reducing valve) associated with the clutch 100. Specifically, as shown in FIG. 3, the valve 128 may be configured to receive pressurized fluid from a pump P of the vehicle 10 (e.g., via fluid coupling 130) and may also be in fluid communication with a fluid tank 134 of the vehicle 10 (e.g., via fluid coupling 136). The hydraulic fluid flowing through the valve 128 may then be delivered to the actuator 112 (e.g., via fluid coupling 138).

As is generally understood, operation of the valve 128 may be automatically controlled by the vehicle controller 44 through the transmission of suitable control signals via the communication link(s) 46. Each control signal may generally correspond to a current command associated with a specific electrical current value, which, in turn, may be directly proportional to the pressure of the hydraulic fluid supplied to the actuator 112 from the valve 128. Thus, by varying the current command, the controller 44 may directly control the fluid pressure supplied to the actuator 112 and, thus, control engagement/disengagement of the clutch 100.

Additionally, in several embodiments, one or more pressure transducer(s) or sensor(s) 66 may be provided in order to monitor the pressure of the hydraulic fluid being supplied to the actuator 112. For example, as shown in the illustrated embodiment, the pressure sensor(s) 66 is disposed directly between the clutch control valve 128 and the actuator 112 (e.g., at a location along fluid coupling 138) for monitoring the pressure of the hydraulic fluid. As will be described below, such pressure measurements may be analyzed together with the rotational speed of the clutch can 102 in order to assess the likelihood of whether the clutch 100 is about to experience a centrifugal lock-up.

Moreover, in accordance with aspects of the present subject matter, the hydraulic actuator 112 may also include a pressure relief valve (shown schematically in FIG. 3 as box 144) for allowing hydraulic fluid to be evacuated from the piston chamber 118 (e.g., via coupling 146), thereby providing a means for reducing the fluid pressure within the chamber 118. Specifically, in several embodiments, the pressure relief valve 144 may be configured to he in a "closed" state when the clutch 100 is in engaged (e.g., when the piston 116 has been actuated in direction 124 beyond the "kiss point" of the clutch plate(s) 104, 108), thereby preventing the pressurized fluid from being expelled from the chamber 118 and allowing the clutch 100 to be maintained in its engaged state. However, when the clutch 100 is turned off and the piston retracts backwards in direction 126, the pressure relief valve 144 may be configured to be in an "opened" state to allow at least a portion of the fluid contained within the chamber 118 to be evacuated therefrom, thereby reducing the fluid pressure at the head end 120 of the piston 116 and allowing the clutch 100 to be moved hack to its disengaged state (e.g., via the biasing force applied by the clutch spring(s) 122).

It should be appreciated that the pressure relief valve 144 may generally correspond to any suitable valve-type arrangement known in the art that allows the valve 144 to function as described herein. Specifically, in several embodiments, the pressure relieve valve 114 may correspond to an orifice or port defined in the piston 116 and/or the clutch can 102. In such embodiments, when the pressure relief valve 144 is in its "opened" state, the orifice may be in fluid communication with the chamber 118 so as to provide a flow path for expelling the hydraulic fluid. Similarly, when the valve is in its "closed" state, the orifice may be blocked, covered or otherwise cut-off from the chamber 118 such that the pressurized hydraulic fluid cannot flow through the valve 144.

Figure 4:
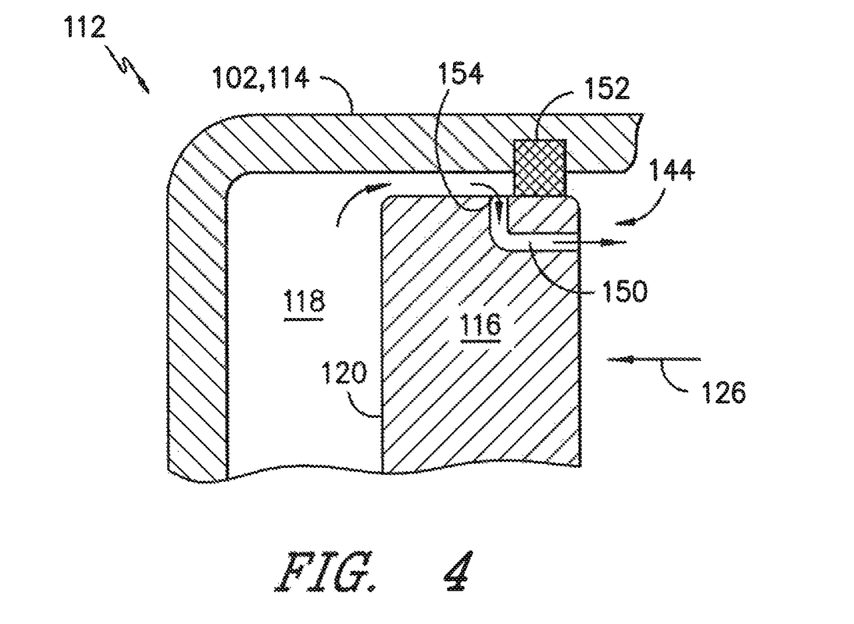
FIG. 4 illustrates a partial, cross-sectional view of one embodiment of a hydraulic actuator in accordance with aspects of the present subject matter, particularly illustrating an example of a pressure relief valve of the hydraulic actuator in an "opened" state.
Figure 5:
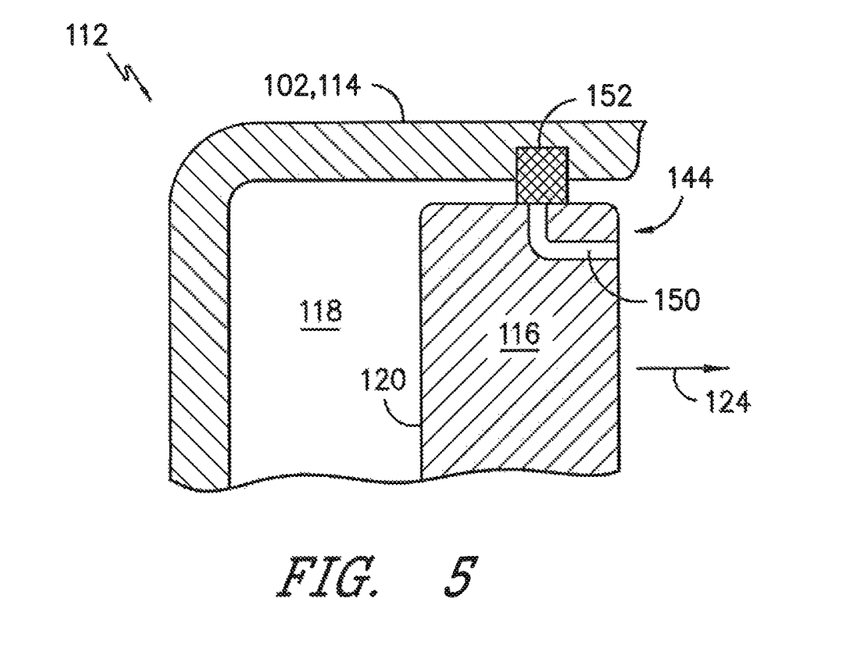
FIG. 5 illustrates another partial, cross-sectional view of the hydraulic actuator shown in FIG. 4, particularly illustrating the pressure relief valve in a "closed" state.

For example, FIGS. 4 and 5 illustrate a simplified view of one embodiment of a suitable pressure relief valve configuration that may be utilized in accordance with aspects of the present subject matter. Specifically, FIG. 4 illustrates the piston 116 in an un-actuated state (i.e., when the clutch is disengaged) and FIG. 5 illustrates the piston 116 in an actuated state (i.e., when the clutch is engaged). As shown, the pressure relieve valve 144 corresponds to an orifice 150 defined in the piston 116. In such an embodiment, the orifice 150 may be defined in the piston 116 such that an associated piston seal 152 positioned between the clutch can 102 and the piston 116 may serve to block or cover the orifice 150 when the clutch 100 is being engaged. In particular, as shown in FIG. 4, when the clutch 100 is disengaged and the piston retracts backwards to its unactuated state (e.g., in the direction of arrow 126), an inlet 154 of the orifice 150 may be positioned rearward of the piston seal 152 such that the orifice 150 is in fluid communication with the piston chamber 118. As such, pressurized fluid contained within the chamber 118 may be evacuated therefrom via the orifice 150 (e.g., as indicated by the arrows). However, when the clutch 100 is being engaged and the piston 116 is actuated forward (e.g., in the direction of arrow 124), the orifice 150 may be aligned with the piston seal 152, thereby sealing off the orifice 150 and preventing the hydraulic fluid contained within the chamber 118 from being expelled therefrom.

It should be appreciated that, in alternative embodiments, the pressure relief valve 144 may have any other suitable configuration that allows it to function as described herein. For example, in one alternative embodiment, the orifice 150 may be defined in the clutch can 102 as opposed to being defined in the piston 116. In such an embodiment, the piston seal 152 may be fixed to the piston 116 such that, as the piston 116 is moved backward and forwards relative to the can 102, the piston seal 152 may cover and uncover the orifice 150.

As indicated above, during normal operation, the pressure relief valve 144 is configured to transition from a "closed" state to an "opened" state when the clutch is commanded to be turned off, thereby allowing hydraulic fluid to be evacuated from the piston chamber 118. However, in certain instances, the pressure relief valve 144 may not open to allow for a sufficient reduction of the fluid pressure within the piston chamber 118 prior to the clutch can 102 reaching a rotational speed at which the resulting centrifugal effect on the fluid causes the piston 118 to be actuated in a manner that engages the clutch plates 104, 108, thereby causing a centrifugal clutch lock-up. For instance, with reference to the example embodiment shown in FIGS. 4 and 5, it is possible that, when the clutch 100 is commanded to be turned off, the fluid pressure within the chamber 118 may not be reduced sufficiently in order to allow the piston 118 to be moved backwards in a manner that opens the pressure relief valve 144 prior to the clutch can 102 reaching its lock-up speed. Such a lack of pressure reduction may be due, for example, to the clutch control valve 128 malfunctioning (e.g., the valve 128 sticking in an opened position) or the valve 128 otherwise not responding properly to the valve command signal transmitted from the controller 44.

Figure 6:
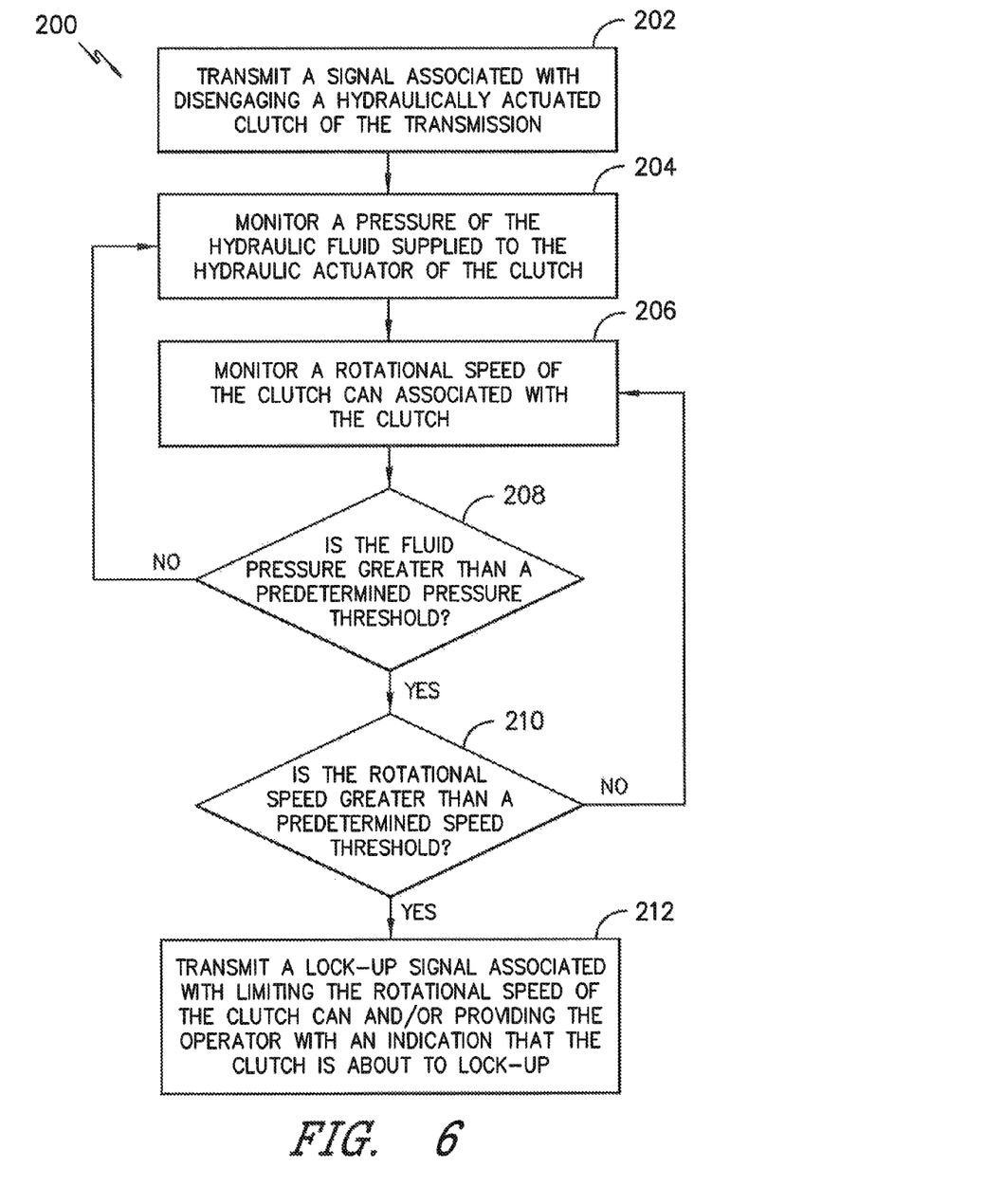
FIG. 6 illustrates a flow diagram of one embodiment of a method for preventing clutch lock-ups within a transmission of a work vehicle in accordance with aspects of the present subject matter.

Referring now to FIG. 6, a flow diagram of one embodiment of a method 200 for preventing centrifugal clutch lock-ups within a transmission of a work vehicle is illustrated in accordance with aspects of the present subject matter. In general, the method will he described herein with reference to the transmission 24 and the hydraulically actuated clutch 100 described above with reference to FIGS. 2 and 3. However, it should be appreciated by those of ordinary skill in the art that the disclosed method 200 may generally be utilized to prevent clutch lock-ups within a transmission having any other suitable configuration and/or with hydraulically actuated clutches having any other suitable clutch configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (202), the method 200 includes transmitting a signal associated with disengaging a hydraulically actuated clutch 100 of the transmission 24. For example, as indicated above, when a clutch 100 is to be turned off or otherwise disengaged, the controller 44 may be configured to transmit a suitable valve command signal to the clutch control valve 128 associated with the clutch 100 that instructs the valve 128 to cut-off the supply of hydraulic fluid to the clutch's hydraulic actuator 112.

Additionally, at (204), the method 200 includes monitoring a fluid pressure of the hydraulic fluid being supplied to the hydraulic actuator 112 of the clutch 100. Specifically, as indicated above, the controller 44 may be communicatively coupled to a pressure sensor(s) 66 configured to provide pressure measurements associated with the fluid pressure of the hydraulic fluid supplied to the actuator 112. For example, as shown in FIG. 3, the pressure sensor(s) 66 may be provided along the flow path of the hydraulic fluid defined between the hydraulic actuator 112 and the clutch control valve 128, such as at a location immediately upstream of the clutch 100. As such, the controller 44 may be configured to continuously monitor the pressure of the hydraulic fluid supplied to the hydraulic actuator 112 based on the pressure measurements provided by the sensor(s) 66.

Referring still to FIG. 6, at (206), the method 200 includes monitoring a rotational speed of the clutch can 102 associated with the clutch 100 being analyzed. In one embodiment, the controller 44 may be configured to directly monitor the rotational speed of the clutch can 102. For example, as indicated above, the controller 44 may be communicatively coupled to a speed sensor(s) 67 configured to sense the rotational speed of each clutch can of the transmission 24. Alternatively, the controller 44 may be configured to indirectly monitor the rotational speed of the clutch can 102. For example, various operating parameters of the work vehicle 10 may provide an indication of the can speed or may otherwise be related to the can speed. As a result, by monitoring such operating parameter(s), the rotational speed of the clutch can 102 may be calculated or estimated, thereby allowing the controller 44 to indirectly monitor the can speed. For instance, in several embodiments, operating parameters that may be correlated to the rotational speed of a given clutch can 102 may include, but are not limited to, the output speed of the engine 23, the output speed of the transmission 24, the motor speed of the fluid motor 40 of the hydrostatic drive unit 30 and the angle of the swashplate 48. By monitoring one or any combination of such parameters, the controller 44 may utilize such data, along with information associated with which clutch(es) are currently engaged within the transmission 24, in order to calculate or estimate the rotational speed of the can clutch 102 associated with any of the various clutches of the transmission 24.

It should be appreciated that, as used herein, the term "monitor" and variations thereof indicates that the various sensors may be configured to provide a direct or indirect measurement of the operating parameters being monitored. Thus, the sensors may, for example, be used to generate signals relating to the operating parameter being monitored, which can then be utilized by the controller 44 to determine or predict the actual operating parameter, such as similar to that described above with reference to rotational speed of the clutch can 102.

Additionally, at (208) and (210), the method 200 may include comparing both the monitored fluid pressure and the monitored can speed to a corresponding threshold value. Specifically, as shown in FIG. 6, at (208), the pressure of the hydraulic fluid supplied to the actuator 112 may be compared to a predetermined pressure threshold. In doing so, if the fluid pressure is less than the predetermined pressure threshold, the controller 44 may simply continue to monitor the fluid pressure and subsequently compare such monitored pressure to the threshold. However, as shown in FIG. 6, if the fluid pressure is greater than the predetermined pressure threshold, the controller may, at (210), be configured to compare the rotational speed of the clutch can 102 to a predetermined speed threshold. In doing so, if the can speed is less than the predetermined speed threshold, the controller 44 may simply continue to monitor the can speed and (assuming that the fluid pressure still exceeds the pressure threshold) subsequently compare such monitored speed to the speed threshold. In contrast, if the rotational speed of the clutch can 102 is greater than the predetermined speed threshold, the controller 44 may, at (212) be configured to transmit a lock-up signal in an attempt to prevent a centrifugal lock-up of the clutch 100. Specifically, as will be described below, the thresholds associated with the fluid pressure and the can speed may be selected such that, when both thresholds are exceeded, there is a high likelihood that the clutch 100 is about to lock-up. In such instance, the controller 44 may be configured to transmit a lock-up signal so as to implement a suitable corrective action for preventing the occurrence of the lock-up and/or to warn the operator that a clutch lock-up is likely to occur.

In several embodiments, the predetermined pressure threshold may correspond to the fluid pressure at which hydraulic fluid must be supplied to the hydraulic actuator 112 such that the force of the fluid acting on the piston 118 is substantially equal to the biasing force applied by the clutch spring(s) 122. As a result, when the monitored fluid pressure is less than the predetermined pressure threshold, the biasing force provided by the clutch spring(s) 122 may be sufficient to cause the piston 118 to retract in a manner that opens the corresponding pressure relief valve 144. This is typically the case when a given clutch has been commanded to be turned off. Specifically, when a suitable valve control command is transmitted to the clutch control valve 128 instructing the valve 128 to close, it is expected that the fluid pressure of the hydraulic fluid supplied to the actuator 112 will immediately (or at least after a very short time period) be reduced to a level below which the biasing force provided by the clutch spring(s) 122 overcomes the force provided by the hydraulic fluid, thereby allowing the piston 116 to be retracted so as to open the pressure relief valve 114. However, when the clutch control valve 128 malfunctions or does not otherwise properly reduce the pressure of the fluid being supplied to the hydraulic actuator 112, the fluid pressure within the piston chamber 118 may remain sufficiently high (i.e., at a level above the predetermined pressure threshold) so as to prevent the piston 116 from being retracted in a manner that causes the pressure relief valve 114 to be opened. As indicated above, in such instance, the clutch 100 may be subjected to centrifugal lock-up depending, of course, on the rotational speed of the corresponding clutch can 102.

Additionally, in several embodiments, the predetermined speed threshold may correspond to a rotational speed that is less than the lock-up speed associated with the clutch can 102. As used herein, the term "lock-up speed" corresponds to the rotational speed at which, when the pressure of the hydraulic fluid supplied to the actuator 112 exceeds the predetermined pressure threshold, the clutch 100 locks-up due to the centrifugal effect on the fluid contained within the chamber 118. Thus, by selecting the predetermined speed threshold to be a rotational speed that is less than the lock-up speed for the clutch 100, a speed or control margin may be provided that allows the controller 44 to take action prior to the clutch actually locking-up. For example, in a particular embodiment, the predetermined speed threshold may correspond to a rotational speed ranging from 99% of the lock-up speed for the clutch can 102 to 80% of the lock-up speed for the clutch can 102, such as a speed ranging from about 99% to about 85% of the lock-up speed or from about 99% to about 90% of the lock-up speed.

As indicated above, assuming that both the monitored fluid pressure and the monitored can speed each exceed their corresponding threshold value, the method may, at (212) include transmitting a lock-up signal associated with limiting the rotational speed of the clutch can 102 and/or providing the operator with an indication that the clutch 100 is about lock-up. Specifically, in several embodiments, the controller 44 may be configured to transmit a lock-up signal corresponding to a control command(s) configured to control the operation of the work vehicle 10 in a manner that limits or reduces the output speed of the engine 23 and/or the transmission 24 so as to prevent the rotational speed of the clutch can 102 from increasing above the lock-up speed prior to the fluid pressure being reduced to a level below the pressure threshold. For example, in one embodiment, the controller 44 may be configured to transmit a control command to a component(s) of the engine 23 in order control the operation of such component(s) in a manner that limits or reduces the corresponding rotational speed of the clutch 100, such as by transmitting a control command to a speed governor of the engine 23 in order to reduce or limit the engine output speed. In addition, or an alternative thereto, the controller 44 may be configured to transmit a control command to a component(s) of the transmission 24 in order control the operation of such component(s) in a manner that limits or reduces the corresponding rotational speed of the clutch 100, such as by transmitting a control command to the hydrostatic power unit 30 and/or the parking brake 70 in order to reduce or limit the transmission output speed.

In addition such control command(s), or as an alternative thereto, the controller 44 may be configured to transmit a lock-up signal corresponding to a warning signal that provides the operator with an indication that the clutch is likely to lock-up unless some type of corrective action is taken in order to limit or reduce the rotational speed of the clutch can 102. Specifically, in several embodiments, an audible and/or visual warning may be provided to the operator. For instance, in a particular embodiment, a textual message or warning light may be provided to the operator on the display panel 22 contained within the cab 18 that indicates that one of the transmission clutches is about to lock-up. Upon receipt of the warning, the operator may then reduce the speed of the vehicle 10 or take any other suitable action to prevent the clutch from locking-up.

It should be appreciated that, as indicated above, the present subject matter is also directed to a system for preventing centrifugal clutch lock-ups within a transmission of a work vehicle. In general, the disclosed system may include any combination of the various components described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for preventing centrifugal clutch lock-ups within a transmission of a work vehicle, the method comprising:
   controlling, with a computing device, an operation of a clutch control valve so as to initiate disengagement of a clutch of the transmission, the clutch control valve being configured to control a supply of hydraulic fluid to a hydraulic actuator of the clutch, the hydraulic actuator having a pressure relief valve, the pressure relief valve being configured to allow the hydraulic fluid to be evacuated from a piston chamber of the hydraulic actuator when the pressure relief valve is in an opened state;
   monitoring, with the computing device, a pressure of the hydraulic fluid supplied to the hydraulic actuator relative to a predetermined pressure threshold;
   monitoring, with the computing device, a rotational speed of a clutch can associated with the clutch relative to a predetermined speed threshold, the predetermined speed threshold being defined relative to a lock-up speed associated with the clutch can; and
   when the pressure exceeds the predetermined pressure threshold and the rotational speed exceeds the predetermined speed threshold, controlling, with the computing device, an operation of at least one component of the work vehicle so as to limit the rotational speed of the clutch can.

2. The method of claim 1, wherein the predetermined pressure threshold corresponds to a fluid pressure at which the hydraulic fluid contained within the piston chamber applies a force against a piston of the hydraulic actuator that is substantially equal to a biasing force applied by a clutch spring of the hydraulic actuator.

3. The method of claim 1, wherein monitoring the pressure of the hydraulic fluid comprises monitoring the pressure using a pressure sensor positioned along a flow path of the hydraulic fluid defined between the hydraulic actuator and the clutch control valve.

4. The method of claim 1, wherein monitoring the rotational speed of the clutch can comprises determining the rotational speed of the clutch can based on at least one of an output speed of the transmission, an output speed of an engine of the work vehicle, a motor speed of a fluid motor of a hydrostatic power unit of the transmission or an angle of a swashplate of the hydrostatic unit.

5. The method of claim 1, wherein the predetermined speed threshold corresponds to a speed that is less than the lock-up speed associated with the clutch can.

6. The method of claim 5, wherein the predetermined speed threshold corresponds to a speed ranging from 99% to 80% of the lock-up speed.

7. The method of claim 1, wherein controlling the operation of the clutch control valve comprises transmitting a valve command signal to the clutch control valve, the valve command signal being associated with cutting off the supply of hydraulic fluid to the hydraulic actuator.

8. The method of claim 1. wherein controlling an operation of at least one component of the work vehicle comprises controlling the operation of a component associated with at least one of an engine of the work vehicle or the transmission in a manner that limits or reduces an engine output speed or a transmission output speed of the work vehicle.

9. The method of claim 1, further comprising controlling an operation of an output device located in a cab of the work vehicle so as to provide at least one of an audible or visual notification to an operator of the work vehicle that a clutch lock-up is likely to occur.

10. The method of claim 1, wherein the pressure relief valve corresponds to an orifice defined in the clutch can or a piston of the hydraulic actuator.

11. A system for preventing centrifugal clutch lock-ups within a transmission of a work vehicle, the system comprising:
a clutch of the transmission, the clutch including a clutch can and a hydraulic actuator having a piston and defining a piston chamber, the hydraulic actuator further including a pressure relief valve configured to allow hydraulic fluid to be evacuated from the piston chamber when the pressure relief valve is in an opened state;
a clutch control valve configured to control the supply of hydraulic fluid to the hydraulic actuator;
a pressure sensor configured to provide pressure measurements associated with a fluid pressure of the hydraulic fluid supplied to the hydraulic actuator; and
a controller communicatively coupled to the clutch control valve and the pressure sensor, the controller being configured to:
control an operation of the clutch control valve so as to initiate disengagement of the clutch;
monitor the fluid pressure of the hydraulic fluid supplied to the hydraulic actuator relative to a predetermined pressure threshold;
monitor a rotational speed of the clutch can relative to a predetermined speed threshold, the predetermined speed threshold being defined relative to a lock-up speed associated with the clutch can; and
when the pressure exceeds the predetermined pressure threshold and the rotational speed exceeds the predetermined speed threshold, control an operation of at least one component of the work vehicle so as to limit the rotational speed of the clutch can.

12. The system of claim 11, wherein the predetermined pressure threshold corresponds to a fluid pressure at which the hydraulic fluid contained within the piston chamber applies a force against the piston that is substantially equal to a biasing force applied by a clutch spring of the hydraulic actuator.

13. The system of claim 11, wherein the controller is configured to indirectly monitor the rotational speed of the clutch can based on at least one of an output speed of the transmission, an output speed of an engine of the work vehicle, a motor speed of a fluid motor of a hydrostatic power unit of the transmission or an angle of a swashplate of the hydrostatic unit.

14. The system of claim 11, wherein the predetermined speed threshold corresponds to a speed that is less than the lock-up speed associated with the clutch can.

15. The system of claim 14, wherein the predetermined speed threshold corresponds to a speed ranging from 99% to 80% of the lock-up speed.

16. The system of claim 11, wherein the controller is configured to control the operation of the clutch control valve by transmitting a valve command signal associated with cutting off the supply of hydraulic fluid to the hydraulic actuator.

17. The system of claim 11, wherein the controller is configured to limit the rotational speed of the clutch can by controlling a component of at least one of an engine of the work vehicle or the transmission in a manner that limits or reduces an engine output speed or a transmission output speed of the work vehicle.

18. The system of claim 11, wherein the controller is further configured to control an operation of an output device of the work vehicle so as to provide at least one of an audible or visual notification to an operator of the work vehicle that a clutch lock-up is likely to occur.

19. The system of claim 11, wherein the pressure relief valve corresponds to an orifice defined in the piston or the clutch can.

20. A computer-implemented method for preventing centrifugal clutch lock-ups within a transmission of a work vehicle, the method comprising:
controlling, with a computing device, an operation of a clutch control valve so as to initiate disengagement of a clutch of the transmission, the clutch control valve being configured to control a supply of hydraulic fluid to a hydraulic actuation of the clutch, the hydraulic actuator having a pressure relief valve, the pressure relief valve being configured to allow the hydraulic fluid to be evacuated from a piston chamber of the hydraulic actuator when the pressure relief valve is in an opened state;
monitoring, with the computing device, a pressure of the hydraulic fluid supplied to the hydraulic actuator relative to a predetermined pressure threshold;
monitoring, with the computing device, a rotational speed of a clutch can associated with the clutch relative to a predetermined speed threshold, the predetermined speed threshold being defined relative to a lock-up speed associated with the clutch can; and
when the pressure exceeds the predetermined pressure threshold and the rotational speed exceeds the predetermined speed threshold, controlling, with the computing device, an operation of an output device of the work vehicle so as to provide at least one of an audible or visual notification to an operator of the work vehicle that a clutch lock-up is likely to occur.

* * * * *